No. 664,921. Patented Jan. 1, 1901.
J. W. AREHART.
DRAFT EQUALIZER.
(Application filed Apr. 24, 1900.)
(No Model.)
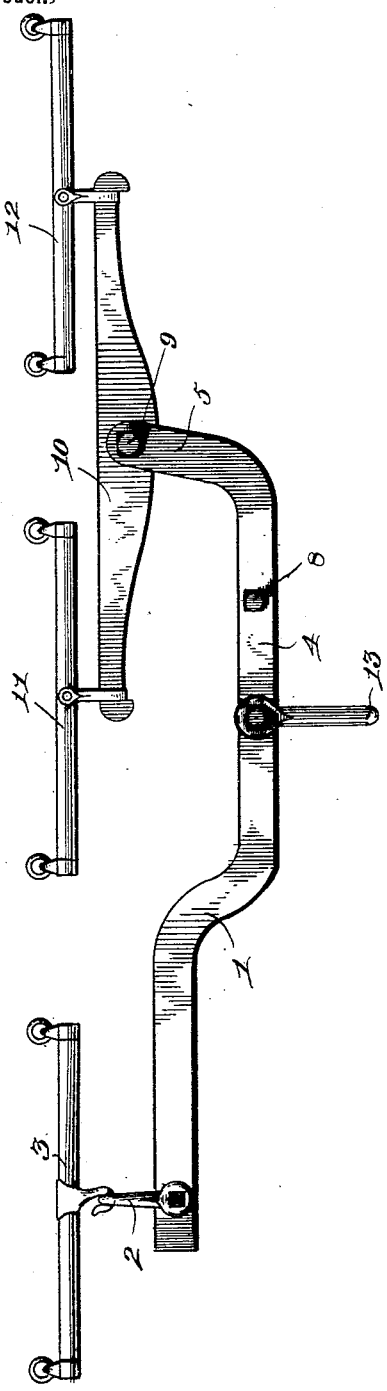
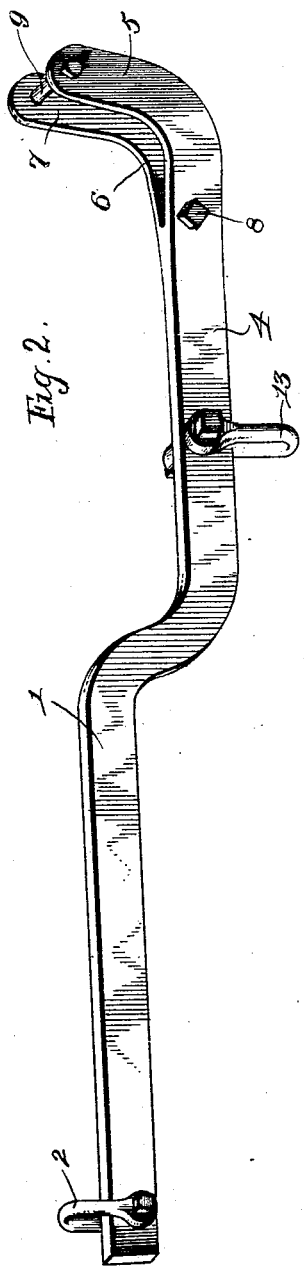
Witnesses
By his Attorneys,
J. W. Arehart, Inventor

UNITED STATES PATENT OFFICE.

JESSE W. AREHART, OF HARRISBURG, OREGON.

DRAFT-EQUALIZER.

SPECIFICATION forming part of Letters Patent No. 664,921, dated January 1, 1901.

Application filed April 24, 1900. Serial No. 14,125. (No model.)

*To all whom it may concern:*

Be it known that I, JESSE W. AREHART, a citizen of the United States, residing at Harrisburg, in the county of Linn and State of Oregon, have invented a new and useful Draft-Equalizer, of which the following is a specification.

This invention relates to draft-equalizing devices, and has for its object to provide an improved form of evener-beam, which is arranged to locate the singletree and the doubletree in alinement to permit of an inward movement of the inner end of the doubletree without striking the evener, and to facilitate the application of the device to agricultural implements, whether the latter have poles or not.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a top plan view of a draft-equalizer constructed in accordance with the present invention. Fig. 2 is a detail perspective view of the equalizing-beam.

Corresponding parts in both figures of the drawings are designated by like characters of reference.

Referring to the accompanying drawings, 1 designates the equalizing-beam, which is formed of metal and is provided at one end with a clevis 2 for connection with a singletree 3. The opposite end portion of the beam is offset rearwardly, as at 4, and its outer end is bent forwardly to form a lateral arm 5. Welded to the offset portion of the beam is a substantially L-shaped bar 6, that has its transverse portion 7 inclined away from the arm 5, so as to form a companion arm, and thereby provide a fork at this end of the beam. The members of the fork are further braced and connected by means of a bolt or rivet 8. The extremities of the fork members 5 and 7 are provided with alined perforations for the reception of a removable bolt or pin 9 for connection with a doubletree 10, that is provided at its opposite ends with suitable draft connections, as singletrees 11 and 12, so that the latter may be alined with the singletree 3 at the opposite end of the evener. Intermediate of the opposite ends of the offset portion of the evener-bar, and nearer the outer end thereof, there is provided a clevis 13 for connection with the plow or other agricultural implement or machine.

From the foregoing description it will be seen that the present invention provides a strong and durable evener-beam, which is arranged to place the singletree and the doubletree in alinement by reason of its peculiar shape and also permits of an inward swing of the inner end of the doubletree without coming in contact with the evener by reason of the offset portion thereof, which extends inwardly beyond the inner end of the doubletree.

What is claimed is—

An evener for a draft-equalizer, consisting of a metallic bar, which is bent intermediate of its ends and rearwardly forming a longitudinally-disposed rearwardly-offset end portion, the outer extremity of which is bent transversely forward, a substantially L-shaped metal bar, having its main portion welded to the offset portion of the evener-bar, and its transverse part corresponding to the transverse end of the evener and also inclined away therefrom forming therewith a fork, a removable bolt or pin passed through the outer ends of the members of the fork, a bolt or pin connecting the two bars at or adjacent to the intersection thereof, a rearwardly-directed clevis located intermediate of the offset portion, and another clevis projecting forwardly from the opposite end of the evener-bar.

In testimony that I claim the foregoing as my own I have hereto affixed my signature in the presence of two witnesses.

JESSE W. AREHART.

Witnesses:
H. C. WATSON,
L. L. SWAN.